(No Model.)

H. A. HARVEY.
NUT LOCK.

No. 340,308. Patented Apr. 20, 1886.

Witnesses:
Geo. W. Miatt
R. C. Howes

Inventor:
Hayward A. Harvey
Per Edw. E. Quincy
Atty.

United States Patent Office.

HAYWARD A. HARVEY, OF ORANGE, NEW JERSEY.

NUT-LOCK.

SPECIFICATION forming part of Letters Patent No. 340,308, dated April 20, 1886.

Application filed November 24, 1885. Serial No. 183,840. (No model.)

*To all whom it may concern:*

Be it known that I, HAYWARD A. HARVEY, of Orange, New Jersey, have invented a certain Improvement in Cramping-Washers for Bolts and Nuts, of which the following is a specification.

This invention relates to the combination of a bolt and nut of ordinary construction with a helically-curved spring-washer, which is provided upon that one of its faces intended for impact against the nut with a projecting rib, the apex of which, by the screwing home of the nut, is made to embed itself progressively in the face of the nut, and to thereby progressively compress upon the bolt a portion of the metal of the nut immediately adjoining the bolt. This washer combines the features of usefulness both of the helical spring-washers and of the ring or ribbed washers which have been heretofore employed—that is to say, by the expansive force stored up in it when the nut is screwed home it exerts upon the nut a strong outward pressure, tending to prevent the nut from becoming unscrewed, while by the impingement of its rib upon the face of the nut a portion of the metal of the nut is displaced and compressed against the bolt, whereby the nut-thread is made to more tightly embrace the bolt-thread.

Figure 1:
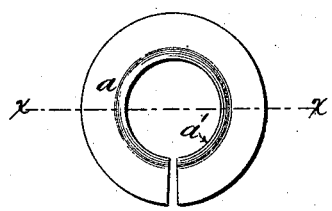
Figure 2:
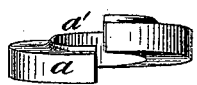
Figure 3:
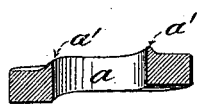
Figure 4:
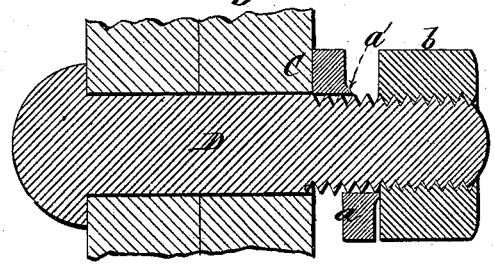
Figure 5:
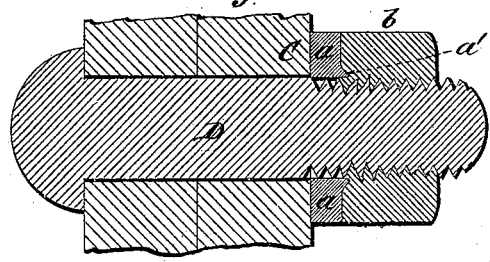

The accompanying drawings, illustrating the improvement, are as follows:

Figure 1 is an end elevation of the washer. Fig. 2 is an isometrical perspective of the washer. Fig. 3 is a transverse section through the line $x\,x$ on Fig. 1; and Fig. 4 is a sectional view of a bolt, nut, and washer, and of an object through which the bolt is inserted. Fig. 5 is a sectional view similar to Fig. 4, showing the nut screwed home, and exhibiting in an exaggerated way the upsetting of the screw-threads produced by the embedding in the face of the nut of the rib on the spring-washer.

The drawings represent a spring-washer in the form of a single convolution, $a$, of a helix made of a steel bar, and having upon its concave edge the projecting rib $a'$.

In Fig. 4, in which the parts are shown in section, the washer $a$ is represented as interposed between the nut $b$ and the face, C, of the object through which the bolt D is inserted.

In the drawings the nut is represented as screwed home, by which the rib $a'$ has been caused to embed itself in the face of the nut, and to compress upon the bolt a portion of the metal of the nut immediately adjoining the bolt. If, in screwing home the nut, sufficient force is exerted to longitudinally stretch the bolt, or if, by the vibrations to which the structure may be exposed, the bolt is caused to stretch, the spring-washer, by its elastic force, will expand against the face of the object through which the bolt is inserted on one side and against the nut on the other side, and thus hold the bolt firmly in place, and prevent any loose endwise movement thereof in the object through which the bolt is inserted.

What is claimed as the invention is—

1. The new article of manufacture herein shown and described, the same consisting of a spring-washer in the form of a single convolution of a helix, and provided with a projecting rib adjacent to the concave edge of that one of its faces which is intended for impact against the face of the nut.

2. The combination, as herein set forth, of a bolt and nut of ordinary construction with a helically-curved spring-washer provided upon that one of its faces which bears against the nut with a projecting rib, the apex of which, by the screwing home of the nut, is made to embed itself in the face of the nut, and to thereby compress upon the bolt a portion of the metal of the nut immediately adjoining the bolt.

H. A. HARVEY.

Witnesses:
R. C. HOWES,
M. L. ADAMS.